United States Patent
Xu et al.

(10) Patent No.: US 9,094,080 B1
(45) Date of Patent: Jul. 28, 2015

(54) METHOD AND APPARATUS FOR ESTIMATING STATISTICS IN WIRELESS SYSTEMS

(71) Applicant: Marvell International Ltd., Hamilton (BM)

(72) Inventors: Mingguang Xu, Sunnyvale, CA (US); Yakun Sun, Sunnyvale, CA (US); Christian R. Berger, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/133,282

(22) Filed: Dec. 18, 2013

Related U.S. Application Data

(60) Provisional application No. 61/749,053, filed on Jan. 4, 2013.

(51) Int. Cl.
*H04L 25/02* (2006.01)
*H04B 1/10* (2006.01)
*H04B 17/364* (2015.01)
*H04B 17/318* (2015.01)

(52) U.S. Cl.
CPC ............ *H04B 1/1081* (2013.01); *H04B 17/318* (2013.01); *H04B 17/364* (2013.01); *H04L 25/0212* (2013.01)

(58) Field of Classification Search
CPC ............ H04L 25/0202; H04L 25/0212; H04L 25/0216; H04B 17/0047; H04B 17/0055; H04B 17/0057; H04B 17/309; H04B 17/318; H04B 17/364
USPC .......... 375/224, 229, 232, 285, 316, 346, 350
See application file for complete search history.

(56) References Cited

U.S. PATENT DOCUMENTS

| | | | |
|---|---|---|---|
| 2008/0175328 A1* | 7/2008 | Lin et al. | 375/232 |
| 2012/0027105 A1* | 2/2012 | Nix et al. | 375/259 |

OTHER PUBLICATIONS

Hoeher, P. et al., "Pilot-Symbol-Aided Channel Estimation in Time and Frequency", Proc. IEEE Global Telecommunications Conference (GLOBECOM '97), Communication Theory Mini-Conference, 7 pgs., 1997.

* cited by examiner

*Primary Examiner* — Betsy Deppe

(57) ABSTRACT

Systems and methods are provided for processing a signal using simplified channel statistics. In an example implementation, a channel profile for a multipath channel is estimated by detecting, within a given range, a number of channel taps associated with a channel impulse response, and assigning each of those channel taps a uniform amplitude value corresponding to a constant signal strength. A signal may be received through the multipath channel and filtered based on the estimated channel profile.

20 Claims, 6 Drawing Sheets

METHOD AND APPARATUS FOR ESTIMATING STATISTICS IN WIRELESS SYSTEMS

CROSS-REFERENCE TO RELATED APPLICATIONS

This patent document claims the benefit of, and priority to, U.S. Provisional Application No. 61/749,053, filed Jan. 4, 2013, the disclosure of which is hereby incorporated herein by reference in its entirety.

FIELD OF USE

This disclosure relates to signal processing techniques, such as filtering techniques, for reducing interference and/or noise in a signal received through a multipath channel in a wireless communications system.

BACKGROUND OF THE DISCLOSURE

In a wireless communications system, signals are sent from a transmitter to a receiver through a medium known as a wireless communications channel. In practice, signals arrive at the receiver by a number of different paths, and the associated channel is referred to as a multipath channel. Various signal processing techniques are employed to reduce interference and/or noise in signals received through multipath channels, such as filtering. Some signal processing techniques, however, require information about the multipath channel to effectively process the signal. Processing a received signal using a Wiener filter, for example, requires knowledge of channel statistics characterizing the multipath channel.

Wireless channels can be characterized by a number of different channel statistics, such as those defined by a power delay profile, a Doppler spectrum, and power angular spectrum. Channel statistics, however, change over time, frequency, and space, and generally cannot be assumed static for a relatively large time scale, for example, the time for transmitting multiple packets or on the order of tens of milliseconds. Accordingly, signal processing techniques may perform sub-optimally in contexts in which channel statistics are rapidly, and continuously, changing.

SUMMARY OF THE DISCLOSURE

Systems and methods are provided for processing a signal using simplified channel statistics. In an example implementation, a channel profile for a multipath channel is estimated (e.g., by a channel profile estimator implemented in hardware, software, or both) by (a) detecting, within a given range, a number of channel taps associated with a channel impulse response, and (b) assigning each of those channel taps a uniform amplitude value corresponding to a constant signal strength. A signal may be received (e.g., by a receiver) through the multipath channel and filtered (e.g., by a filter implemented in hardware, software, or both) based on the estimated channel profile.

In some implementations, the channel profile is a power delay profile and the given range is a period of time. In this approach, the channel profile for the multipath channel is estimated by determining a maximum channel delay of the multipath channel. The period of time is equal to the maximum channel delay. Optionally, the maximum channel delay can be a predefined design parameter. Alternatively, the maximum channel delay can be a variable parameter. In this alternative, the maximum channel delay may be determined by identifying, within a predefined time duration, a last channel tap in the plurality of channel taps.

In some approaches, the plurality of channel taps may be detected by sampling a plurality of observed signals and comparing each to a noise threshold. The plurality of channel taps includes each of the observed signals having an amplitude greater than the noise threshold. In those or other approaches, the given range may be divided into a plurality of subintervals each having a set of candidate channel taps. The assignment of the uniform amplitude value to the plurality of channel taps may then be accomplished by determining, for each respective subinterval, whether that subinterval includes at least one of the plurality of channel taps, and, if so, assigning the uniform amplitude value to each of the candidate channel taps in the respective subinterval.

In still other approaches, the given range is computed by identifying, within a predefined time duration, a first channel tap in the plurality of channel taps, a last channel tap in the plurality of channel taps, or both. Each of the candidate channel taps within the given range may then be assigned the uniform amplitude value. In some instances, each of the channel taps has an observed amplitude that exceeds a noise threshold, while each of the set of candidate channel taps does not exceed that noise threshold.

As noted above, in some implementations, the channel profile is a power delay profile and the given range is a period of time. In other implementations, the channel profile is a Doppler profile and the given range is a frequency range. In still other implementations, the channel profile is a profile power angular spectrum and the given range is an angular range.

BRIEF DESCRIPTION OF THE FIGURES

The above and other aspects and potential advantages will be apparent upon consideration of the following detailed description, taken in conjunction with the accompanying drawings, in which like reference characters refer to like parts throughout, and in which.

DETAILED DESCRIPTION OF THE DISCLOSURE

Disclosed herein are signal processing techniques based on simplified channel statistics. The disclosed techniques may enhance the performance of signal processing techniques, such as filtering, while maintaining low complexity and high reliability. Specifically, using simplified models, a channel profile can be estimated and used to filter a received signal. The channel profile can be computed using various models, each of which reduces complex channel estimation to a relatively simple detection problem. Each of these features is described more fully below along with other techniques and implementations.

Figure 1:
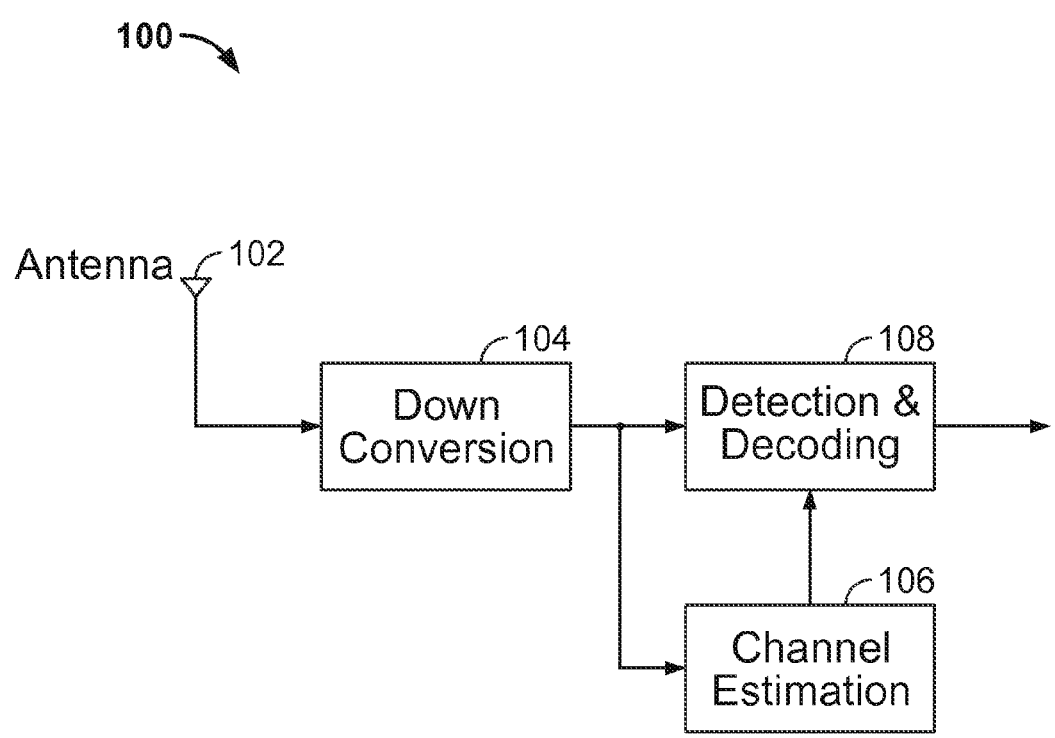
FIG. 1 depicts an example receiver that includes a channel estimation unit in accordance with some implementations.

FIG. 1 depicts an example receiver 100 for receiving and processing signals transmitted through a multipath channel, in accordance with some implementations. Receiver 100 may be, for example, a wireless receiver in a base station or mobile device. Receiver 100 includes antenna 102, down conversion unit 104, detection and decoding unit 108, and channel estimation unit 106. Antenna 102 may be a single antenna or multiple antennas (e.g., in a multiple input multiple output, or MIMO, system). Receiver 100 may also include other units and circuitry, but the simplified block diagram of FIG. 1 is provided for ease of discussion.

A transmitted signal is received by antenna 102 and provided to down conversion unit 104, which converts the received signal to a baseband signal. Channel estimation unit 106 receives the baseband signal and computes simplified channel statistics such as a channel profile. A channel profile may be, for example, a power delay profile (PDP), a Doppler spectrum, a power angular spectrum, etc. A power delay profile provides the signal strength on average of various receptions of the same transmitted signal—each received through a different path of the multipath signal—as a function of time delay. Each of these receptions is known as a "channel tap." A Doppler spectrum provides the signal strength on average of the various incoming receptions, each subject to its own Doppler shift, as a function of frequency. A power angular spectrum provides the signal strength on average of the various incoming receptions as a function of each received signal's angle of incidence.

Channel estimation unit 106 may also include a filter, e.g., a Wiener filter. The filter uses the simplified channel statistics (e.g., a channel profile) to produce an estimate of the channel. A Wiener filter, for instance, calculates channel correlation coefficients using the power delay profile. Thus, in some arrangements, channel estimation unit 106 includes circuitry and/or software for generating the simplified channel statistics and circuitry and/or software for filtering a signal using the simplified channel statistics. The channel estimate generated by channel estimation unit 106 is provided, along with the baseband signal produced by down conversion unit 104, to detection and decoding unit 108, where the signal may be further processed (e.g., to reduce noise or increase the data reliability) and ultimately decoded (e.g., into soft or hard data bits).

Figure 2:
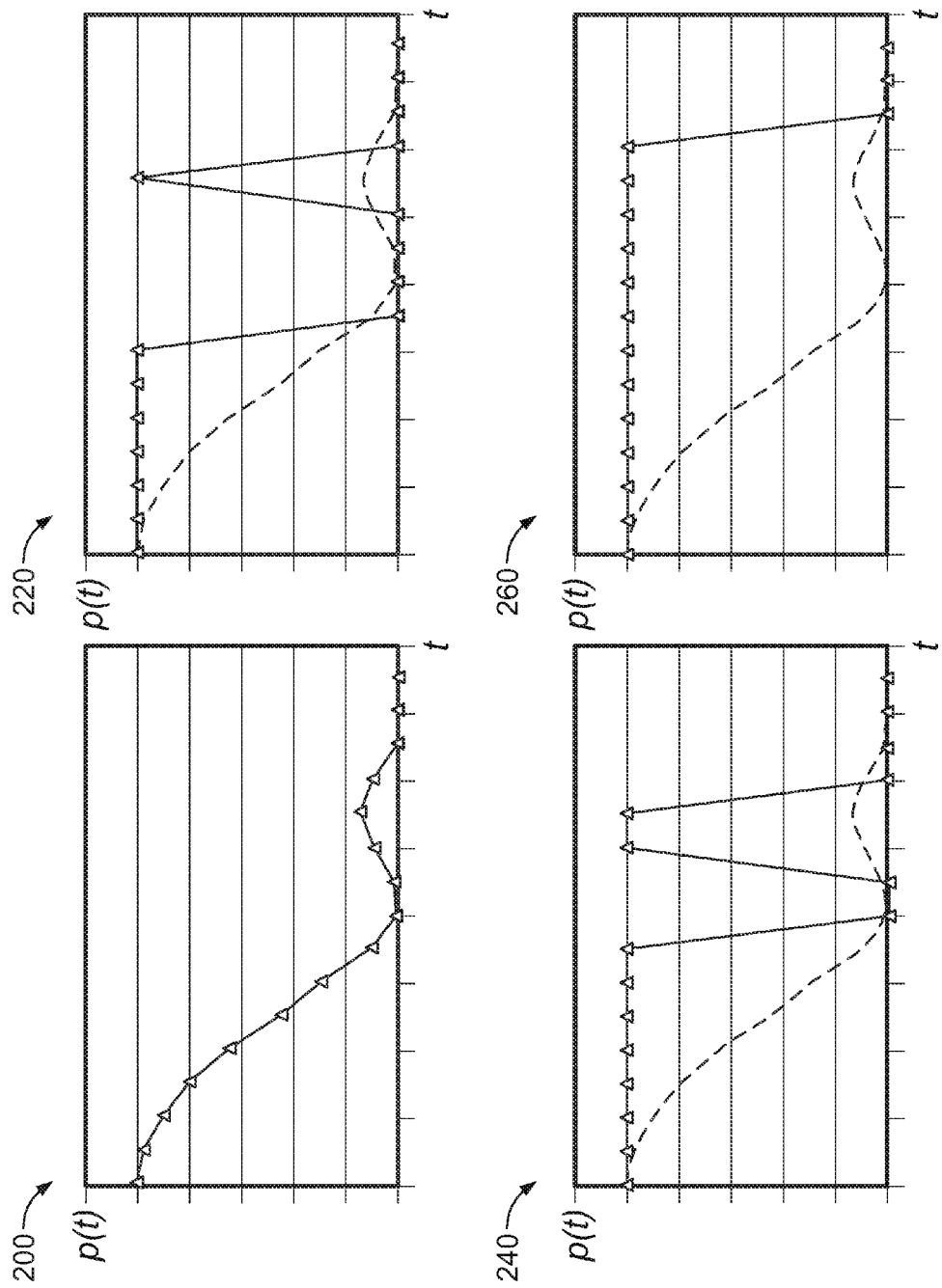
FIG. 2 depicts a set of plots illustrating example simplified channel statistics, such as an estimated channel profile, computed in accordance with some implementations.

Channel estimation unit 106 of FIG. 1 may compute simplified channel statistics in various ways. These techniques include tap detection, block-wise tap detection, and maximum channel delay detection. FIG. 2 depicts a set of plots illustrating the computation of a power delay profile using each of the three aforementioned techniques in accordance with some implementations. The computation of a power delay profile is provided as an illustrative example of a more general approach to computing simplified channel statistics, and it should be understood that the concepts and techniques described below are also applicable to computing channel statistics in other domains (e.g., frequency and angle/spatial direction) to generate, for instance, a Doppler spectrum or power angular spectrum.

Referring to FIG. 2, plot 200 shows an ideal power delay profile along with a set of channel taps. The y-axis provides the signal intensity of each channel tap, while the x-axis provides the time delay of each channel tap. In the ideal case, the amplitude and delay of each channel tap would be perfectly known at all times. However, in practice, accurate estimates of the PDP are extremely difficult to acquire. For example, the channel may be changing too rapidly for effective use of pilot signals, and/or the number of pilot signals may be limited for estimating the complete channel profile. Assuming the PDP is static over a large time scale may result in significant performance degradation if the PDP changes over the time considered. Moreover, there may be a mismatch in the amplitude of the channel profile when, for example, the channel to be estimated is precoded while the pilots used for estimating the channel profile are non-precoded. Computing simplified channel statistics solves this issue by transforming an estimation problem into a detection problem. More particularly, instead of estimating the power and/or delay of each channel tap in the PDP, a simplified PDP can be computed merely by detecting the channel taps and/or detecting the channel length, while assuming the taps have uniform signal strength on average. While the channel statistics produced using these simplified models are of lower granularity, capturing the key channel parameters is both easier and more reliable. The simplified channel statistics, moreover, provide significant performance gains.

One technique for computing a simplified PDP, which depends on tap detection, is referred to herein as the "tap detection technique." In particular, an a priori maximum length of the channel ($L_{max}$), which may be a design parameter, is used as the channel length and channel taps within the channel are detected. Specifically, all channel taps having a delay prior to the maximum channel delay (which is equivalent to the channel length) are detected. Channel taps may be detected, for example, in response to receiving a pilot signal from the transmitter. The detected channel taps are then assigned the same signal intensity, i.e., a constant (or uniform) amplitude value. Plot 220 shows a power delay profile generated using the tap detection technique. As shown in plot 220, all detected channel taps are assigned the same amplitude, such that the channel delay profile roughly models the ideal power delay profile (shown as a dotted line).

In some implementations, an autocorrelation matrix of the channel impulse response may be generated, and in general the diagonal terms of the autocorrelation matrix represent the signal intensity on average on the each tap. Equation 1 describes a formula that may be used to construct the autocorrelation matrix.

$$E[hh^H] = \begin{bmatrix} p_1 & \cdots & 0 \\ \vdots & \ddots & \vdots \\ 0 & \cdots & p_{L_{max}} \end{bmatrix}, p_k = \begin{cases} 1, \text{ if } h_k \neq 0 \\ 0, \text{ if } h_k = 0 \end{cases} \quad \text{Eq. 1}$$

In Equation 1, $E[hh^H]$ is the autocorrelation matrix, h is a column vector representing the channel's impulse response over time, $h^H$ is the Hermitian transpose of vector h, $h_k$ is the actual detected value of the kth channel tap, and $p_k$ is a power assigned to the kth channel tap, where k is an integer between 1 and $L_{max}$. In the autocorrelation matrix of Equation 1, all values not on the diagonal are assumed to be zero; that is, all channel paths are assumed to be independent. As shown by Equation 1, anytime a channel tap is detected, it is assigned a value of 1 in the autocorrelation matrix, otherwise, it is assigned the value 0. It should be understood, however, that the assigned value may be any suitable value, e.g., based on whether the channel tap, as observed, exceeds one or more threshold values.

Another technique for computing a simplified PDP, which depends on tap detection, is referred to herein as the "block-wise tap detection technique." Again, the a priori maximum length of the channel ($L_{max}$) is used as the channel length and channel taps within the channel are detected. However, in this technique, the channel is divided into subintervals referred to as "blocks" and all potential channel taps within a given block are assigned the constant amplitude value so long as at least one channel tap in the block is detected or the sum of the power in the block is detected. Specifically, all channel taps having a delay less than the maximum channel delay (which is equivalent to the channel length) are detected. Channel taps may be detected, for example, in response to receiving a pilot signal from the transmitter. The detected channel taps, along with all potential (or "candidate") channel taps in the same blocks, are then assigned the same signal intensity, i.e., a constant amplitude value. Plot 240 shows a power delay profile generated using the block-wise tap detection technique with a block size of two. As shown in plot 240, all detected channel taps are assigned the same amplitude, and all potential channel taps grouped in the same block as a detected channel tap are assigned the same amplitude.

In some implementations of the block-wise tap detection technique, an autocorrelation matrix of the channel impulse response may be generated. Equation 2 describes a formula that may be used to construct the autocorrelation matrix.

$$E[hh^H] = \begin{bmatrix} p_1 I_{L_{max}/n} & \cdots & 0 \\ \vdots & \ddots & \vdots \\ 0 & \cdots & p_n I_{L_{max}/n} \end{bmatrix}, \quad \text{Eq. 2}$$

$$p_k = \begin{cases} 1, & \text{if } \exists l \in \left[\frac{(k-1)L_{max}}{n}, \frac{kL_{max}}{n}\right], h_l \neq 0 \\ 0, & \text{otherwise} \end{cases}$$

In Equation 2, $E[hh^H]$ is the autocorrelation matrix, h is a column vector representing the channel's impulse response over time, $h^H$ is the Hermitian transpose of vector h, $h_1$ is the actual detected value of the lth channel tap, I is the identity matrix, $p_k$ is a power assigned to all channel taps (both detected and undetected) in the kth block, and n is the number of blocks in the channel, where l is an integer between 1 and $L_{max}$ and k is an integer between 1 and $$\frac{L_{max}}{n}.$$

In the autocorrelation matrix of Equation 2, all values not on the diagonal are assumed to be zero; that is, all channel paths are assumed to be independent. As shown by Equation 2, anytime a channel tap is detected, it and all other potential channel taps in the same block are assigned a value of 1 in the autocorrelation matrix, otherwise, all potential channel taps in the block are assigned the value 0. It should be understood, however, that the assigned value may be any suitable value, e.g., based on whether the channel tap, as observed, exceeds one or more threshold values.

A third technique for computing a simplified PDP, which depends on channel length detection, is referred to herein as the "maximum channel delay detection technique." In this approach, the length of the channel (L) is detected dynamically, e.g., by determining the delay of the last channel tap. Channel taps may be detected, for example, in response to receiving a pilot signal from the transmitter. The a priori maximum length of the channel ($L_{max}$) may be used as an upper bound for the detected channel length, i.e., $L \leq L_{max}$. Thus, using the maximum channel delay detection technique, not every channel tap need be detected; instead only an estimate of the actual channel length must be determined. The actual channel length may be determined, for instance, by detecting as many channel taps as possible having a delay that does not exceed $L_{max}$, and using the tap with the longest delay as an indication of the actual channel length. Alternatively, if it is not desirable to process the pilots (e.g., by deriving the channel impulse response over time) in order to detect the maximum channel delay, when an accurate a priori maximum channel length is known, for the purpose of simplicity the channel length may be assumed equal to that value, i.e., $L=L_{max}$. Any other suitable channel length detection method could also be used.

Once the actual channel length is determined, all detected and undetected channel taps having a delay less than or equal to the actual channel length are assigned the same signal intensity, i.e., a constant amplitude value. Plot 260 shows a power delay profile generated using the maximum channel delay detection technique. As shown in plot 260, all detected and undetected channel taps within the channel (as determined by the actual channel length) are assigned the same amplitude value.

In addition to detecting the last channel tap with the maximum delay, a generalization to the maximum channel delay detection technique is to detect the start of the channel taps with the minimum delay as well, e.g., assuming that the channel may not start from the first tap. Once the start and the end of channel taps are determined, all detected and undetected channel taps having a delay in between the start and the end of the channel taps are assigned the same signal intensity, i.e., a constant amplitude value. This generalization is referred to as the "extended maximum channel delay detection technique." Any or all the following discussions related to the maximum channel delay detection technique can be directly extended to the extended maximum channel delay detection technique though, for conciseness, the discussions of the latter are omitted.

In some implementations of the maximum channel delay detection technique, an autocorrelation matrix of the channel impulse response may be generated. Equation 3 describes a formula that may be used to construct the autocorrelation matrix.

$$E[hh^H] = \begin{bmatrix} I_L & \cdots & 0 \\ \vdots & \ddots & \vdots \\ 0 & \cdots & 0 \end{bmatrix} \quad \text{Eq. 3}$$

In Equation 3, $E[hh^H]$ is the autocorrelation matrix, h is a column vector representing the channel's impulse response over time, $h^H$ is the Hermitian transpose of vector h, I is the identity matrix, and L is the actual (e.g., detected) length of the channel. The autocorrelation matrix has a size of $L_{max} \times L_{max}$. In the autocorrelation matrix of Equation 3, all values not on the diagonal are assumed to be zero; that is, all channel paths are assumed to be independent. As shown by Equation 3, all channel taps in the determined channel are assigned a value of 1 in the autocorrelation matrix, regardless of whether the tap was actually detected. It should be understood, however, that the assigned value may be any suitable value and may vary for each tap. For instance, the receiver may, while employing this technique, also attempt to detect channel taps and may adjust the assigned value based on whether the channel tap, as observed, exceeds one or more threshold values.

In some implementations, the three techniques described above are further enhanced by accounting for noise. For example, the detection of channel taps and/or the channel length may be based on one or more realizations of the channel impulse response. When an observation $y_k$ at a $k^{th}$ channel tap position has a nonzero value, it may be due purely to noise ($y_k = n_k$) or it may be due to both the presence of an actual channel tap and noise ($y_k = h_k + n_k$). To account for these possibilities, instead of determining that a channel tap exists anytime a non-zero value is detected at a particular tap position, the measured channel power at that position may be compared to the noise variance of the channel. If the measured channel power exceeds the noise variance, or a threshold value based on the noise variance, a channel tap can be assumed to exist at that position.

Equations 4-6 illustrate how the detection techniques described above can be modified to account for noise. Specifically, Equation 4 corresponds to the tap detection technique discussed above, but differs from Equation 1 insofar as channel taps are detected only when the power of an observed signal exceeds a threshold value (e.g., based on the noise variance).

$$E[hh^H] = \begin{bmatrix} p_1 & \cdots & 0 \\ \vdots & \ddots & \vdots \\ 0 & \cdots & p_{L_{max}} \end{bmatrix}, \quad p_k = \begin{cases} 1, \text{ if } |y_k|^2 > \gamma \cdot \sigma^2 \\ 0, \text{ otherwise} \end{cases} \quad \text{Eq. 4}$$

In Equation 4, $y_k$ is the observed signal intensity at the $k^{th}$ channel tap position, $\gamma$ is a constant used to set the noise threshold, and $\sigma^2$ is the noise variance of the channel. Equation 4 shows that channel taps are detected only if the observation at that position exceeds a threshold value based on the noise variance. Anytime a channel tap is detected in this fashion, it is assigned a value of 1 in the autocorrelation matrix, otherwise, it is assigned the value 0. It should be understood, however, that the assigned value may be any suitable value, e.g., based on whether the channel tap, as observed, exceeds one or more threshold values.

Equations 5A and 5B correspond to the block-wise tap detection technique discussed above, but differ from Equation 2 in the manner in which the block is determined to include a channel tap. As shown in Equation 5A, a block may be determined to include a channel tap when the power of the strongest observed signal exceeds a threshold value (e.g., based on the noise variance). Alternatively, as shown in Equation 5B, a block may be determined to include a channel tap when the sum of the power of all observed signals in the block exceeds a threshold value (e.g., based on the noise variance). In either case, once a channel tap is detected in the block, all detected and undetected channel taps are assigned a constant amplitude value.

$$E[hh^H] = \begin{bmatrix} p_1 I_{L_{max}/n} & \cdots & 0 \\ \vdots & \ddots & \vdots \\ 0 & \cdots & p_n I_{L_{max}/n} \end{bmatrix}, \quad \text{Eq. 5A}$$

$$p_k = \begin{cases} 1, \text{ if } \left( \max_{l \in \left[\frac{(k-1)L_{max}}{n}, \frac{kL_{max}}{n}\right]} |y_l|^2 \right) > \gamma \cdot \sigma^2 \\ 0, \text{ otherwise} \end{cases}$$

$$E[hh^H] = \begin{bmatrix} p_1 I_{L_{max}/n} & \cdots & 0 \\ \vdots & \ddots & \vdots \\ 0 & \cdots & p_n I_{L_{max}/n} \end{bmatrix}, \quad \text{Eq. 5B}$$

$$p_k = \begin{cases} 1, \text{ if } \left( \sum_{l=(k-1)L_{max}/n}^{kL_{max}/n} |y_l|^2 \right) > \gamma \cdot \sigma^2 \\ 0, \text{ otherwise} \end{cases}$$

In Equations 5A and 5B, $y_l$ is the observed signal intensity at the $l^{th}$ channel tap position, $p_k$ is a power assigned to all channel taps (both detected and undetected) in the kth block, n is the presumed number of blocks in the channel, $\gamma$ is a constant used to set the noise threshold, and $\sigma^2$ is the noise variance of the channel, where l is an integer between 1 and $L_{max}$ and k is an integer between 1 and $$\frac{L_{max}}{n}.$$

Equation 6 corresponds to the maximum channel delay detection technique discussed above, but differs from Equation 3 insofar as channel taps are detected only when the power of an observed signal exceeds a threshold value (e.g., based on the noise variance).

$$E[hh^H] = \begin{bmatrix} I_L & \cdots & 0 \\ \vdots & \ddots & \vdots \\ 0 & \cdots & 0 \end{bmatrix}, \quad L = \arg\max_l \{l : |y_l|^2 > \gamma \cdot \sigma^2\} \quad \text{Eq. 6}$$

In Equation 6, L is the detected channel length (which may be capped at $L_{max}$), $y_l$ is the observed signal intensity at the $l^{th}$ channel tap position, $\gamma$ is a constant used to set the noise threshold, and $\sigma^2$ is the noise variance of the channel. Equation 6 shows that the channel length is set equal to the delay of the last detected channel tap having a power that exceeds a threshold value based on the noise variance.

As described above, a variety of simplified models may be used for calculating channel statistics, such as a power delay profile. It should be understood that the models and equations discussed above are more generally adaptable to calculate other types of channel statistics, such as a Doppler spectrum and a power angular spectrum. The models simplify the estimation of channel statistics by requiring detection of only the most significant parameters of the channel statistics, such as the maximum channel delay or the maximum Doppler shift. These simplified models achieve most of the gains obtainable through complete knowledge of the channel profile. Thus, channel estimators (e.g., those employing a Wiener filter) based on the simplified models can provide channel estimates that approach optimal performance. Moreover, the channel statistics generated by these simplified models can be based on one or more channel realizations, and are especially applicable to scenarios in which a limited number of pilot signals are available.

Figure 3:
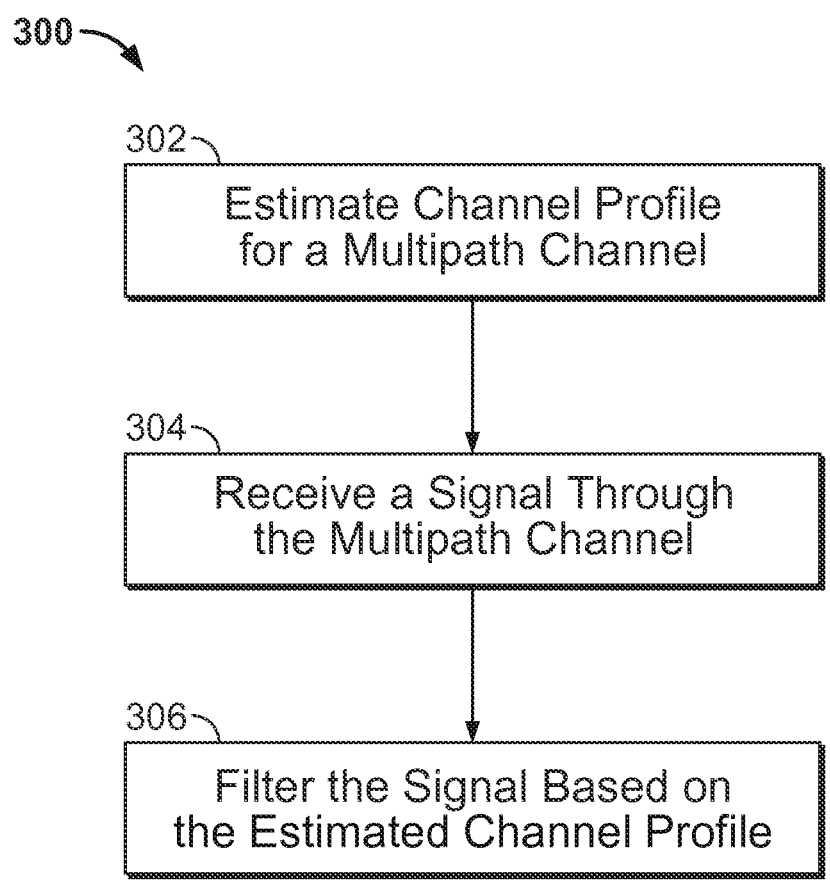
FIG. 3 depicts an example process for filtering a signal using an estimated channel profile in accordance with some implementations.

FIG. 3 illustrates an example process 300 for filtering a signal using an estimated channel profile in accordance with some implementations. At step 302, a channel profile for a multipath channel is estimated. For example, a receiver may estimate a channel profile for a multipath channel using one or more of the simplified models described above. The channel profile may be a power delay profile, Doppler spectrum, power angular spectrum, or any other set of channel statistics used to describe a channel's characteristic response in a particular domain. At step 304, a signal is received through the multipath channel. For example, a mobile receiver may receive a signal transmitted by a base station through the channel. At step 306, the signal is filtered based on the estimated channel profile. A Wiener filter, for instance, may use a power delay profile to generate an estimate of the channel, which can then be used to filter the signal.

Figure 4:
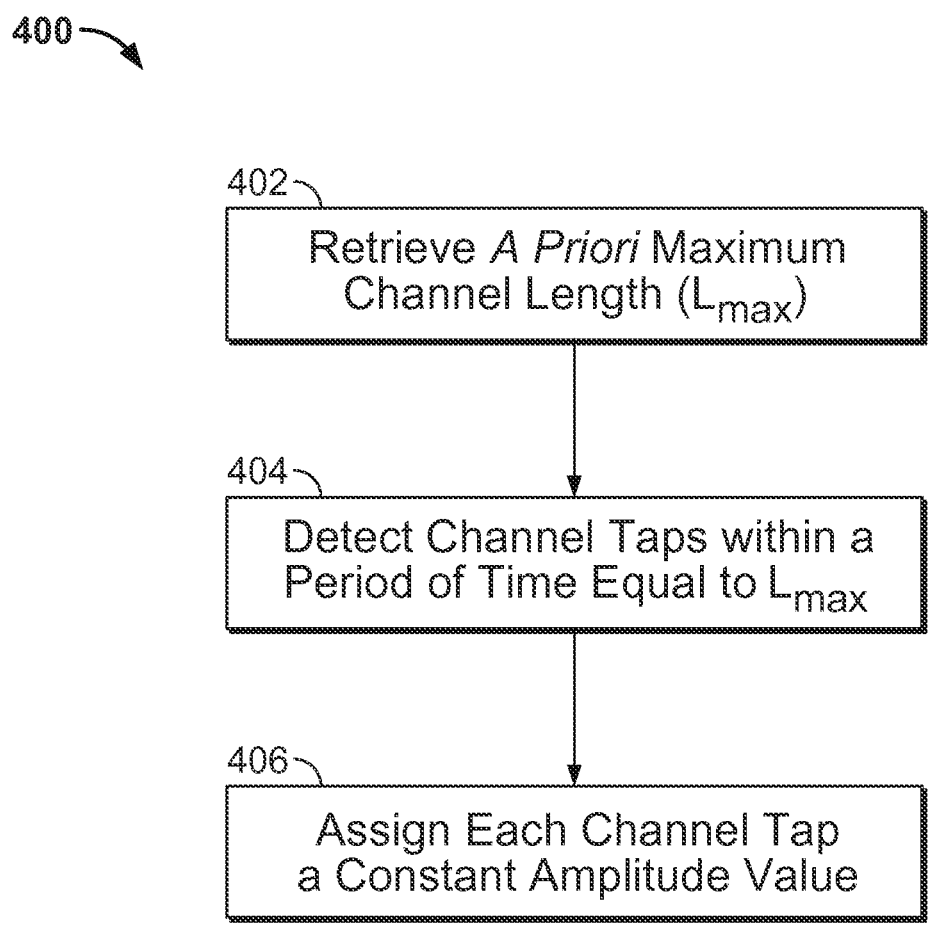
FIG. 4 illustrates an example process for computing an estimated channel profile using tap detection in accordance with some implementations.

FIG. 4 illustrates an example process 400 for computing an estimated channel profile using tap detection in accordance with some implementations. For example, process 400 may be executed at step 302 of process 300 (FIG. 3). At step 402, an a priori maximum channel length is determined or retrieved. In some approaches, the maximum channel length is a predetermined design parameter. At step 404, channel taps are detected within the channel, i.e., channel taps having a delay less than or equal to a period of time equal to the channel length. A channel tap may be detected at any channel tap position where channel energy is present. Alternatively, a channel tap may be detected only at channel tap positions having a power that exceeds a threshold value. In some approaches, the threshold value is based on the channel's noise variance, e.g., a constant multiplied by the noise variance. At step 406, each detected channel tap is assigned a constant amplitude value. Specifically, each detected channel tap is assumed to be of equal signal intensity. The resulting power delay profile may then be used to process signals received through the channel. In some implementations, detected channel taps are assigned one of a plurality of amplitude values. For example, the power of each tap may be compared to a set of threshold values and an amplitude value for the given tap may be selected depending on the result of the comparison.

Figure 5:
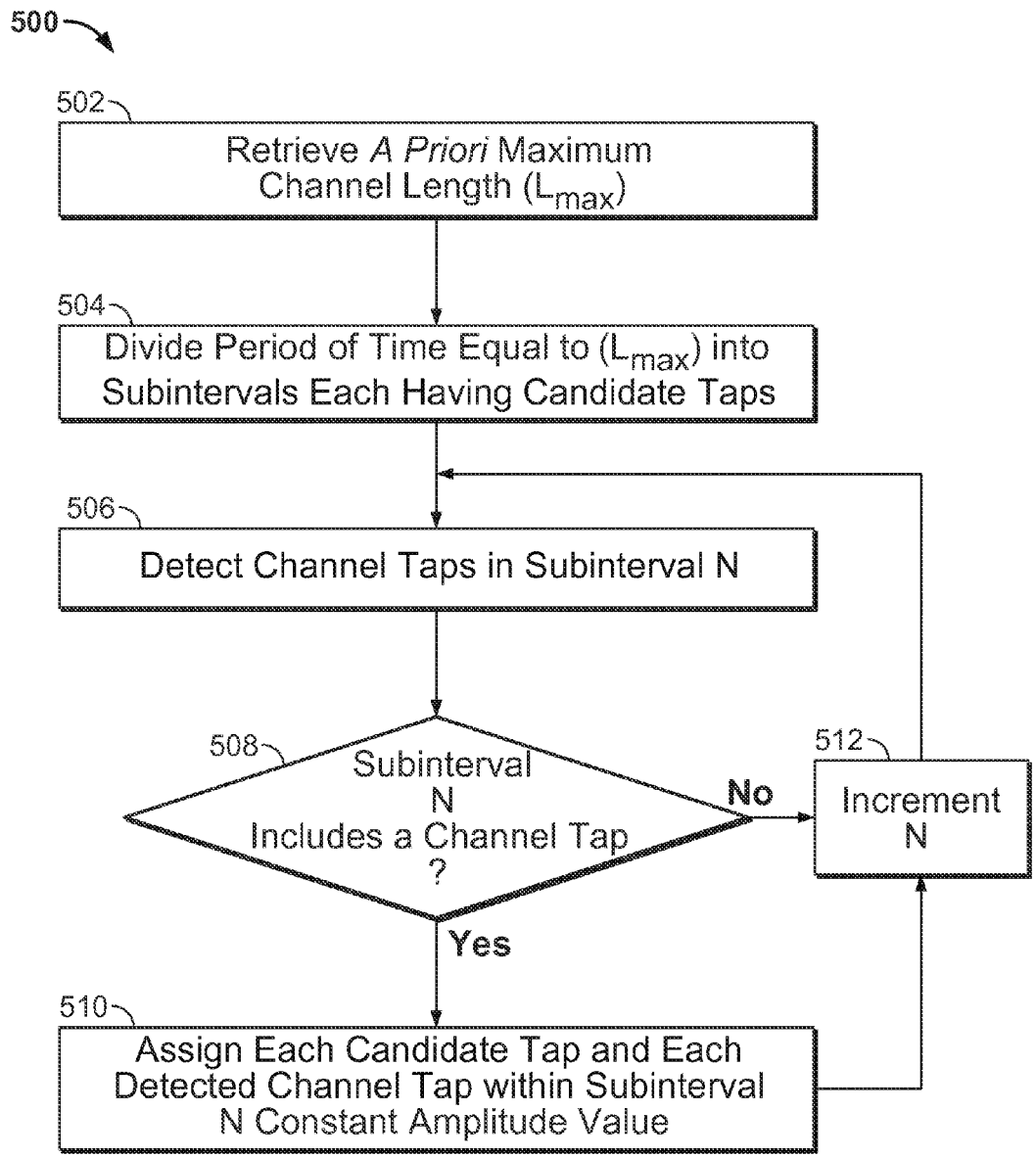
FIG. 5 illustrates an example process for computing an estimated channel profile using block-wise tap detection in accordance with some implementations.

FIG. 5 illustrates an example process 500 for computing an estimated channel profile using block-wise tap detection in accordance with some implementations. For example, process 500 may be executed at step 302 of process 300 (FIG. 3). At step 502, an a priori maximum channel length is determined or retrieved. In some approaches, the maximum channel length is a predetermined design parameter. At step 504, the channel is divided into a number of subintervals (also referred to herein as "blocks"). In particular, a period of time equal to the maximum channel length is divided such that each subinterval represents a subset of channel tap delay times. Each subinterval includes a number of channel tap positions at which a channel tap could be detected (also referred to herein as "candidate taps"). These candidate taps may be detected or remain undetected. At step 506, one or more channel taps in a given subinterval (starting with the first subinterval) are detected. A channel tap may be detected whenever energy is present at a channel tap position, or a channel tap may be detected only when the power (or energy) at that location exceeds a threshold value. In some approaches, the threshold value is based on the channel's noise variance, e.g., a constant multiplied by the noise variance. At step 508, it is determined whether the given subinterval includes at least one detected channel tap. If the given subinterval includes at least one channel tap, the process proceeds to step 510, where each candidate tap and each detected channel tap within the given subinterval are assigned a constant amplitude value. On the other hand, if the given subinterval does not include at least one channel tap, the next subinterval is selected at step 512 (e.g., by incrementing a counter by one), and the process returns to step 506. The process terminates when all subintervals have been assigned amplitude values.

Figure 6:
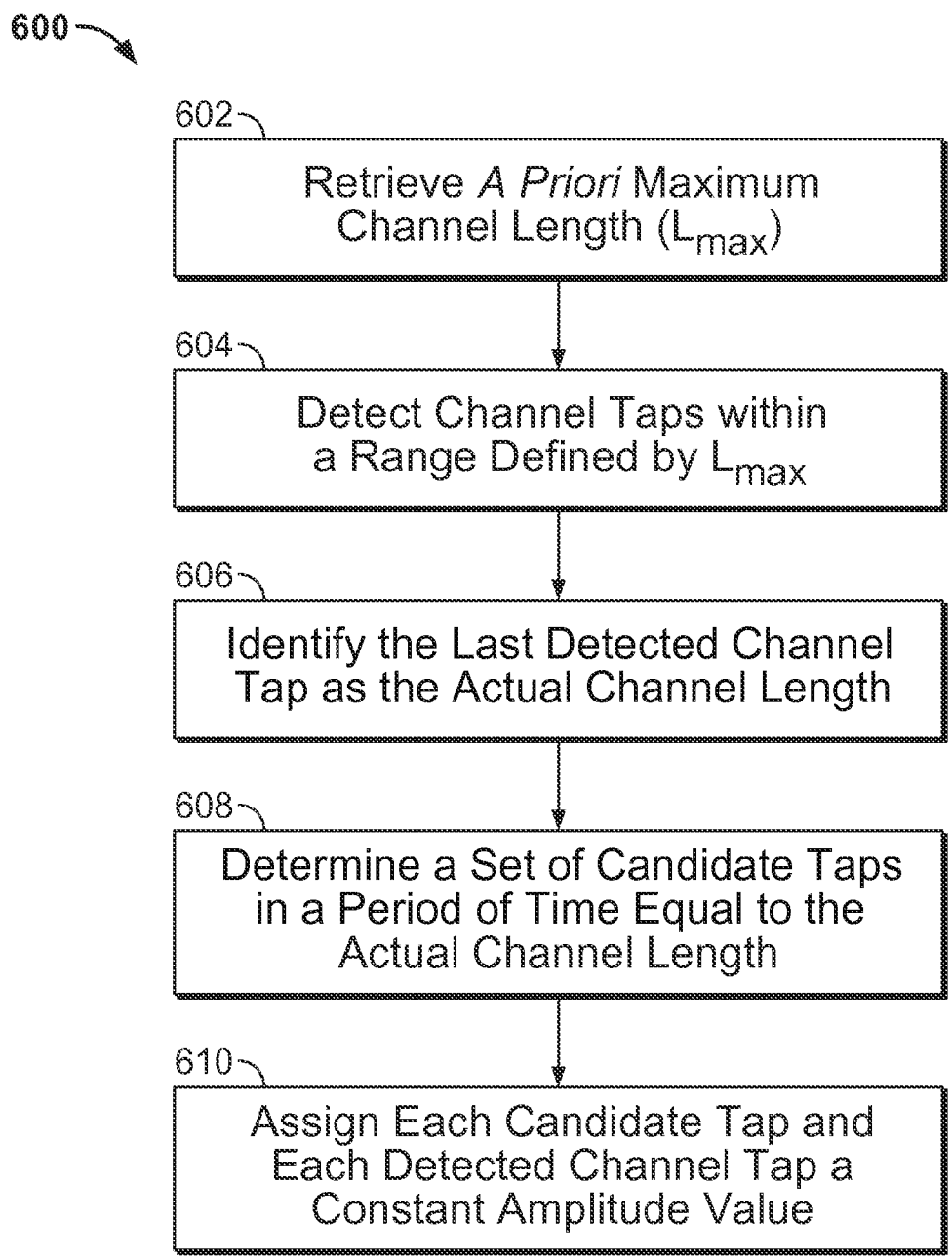
FIG. 6 illustrates an example process for computing an estimated channel profile using maximum channel delay detection in accordance with some implementations.

FIG. 6 illustrates an example process 600 for computing an estimated channel profile using maximum channel delay detection in accordance with some implementations. For example, process 600 may be executed at step 302 of process 300 (FIG. 3). At step 602, an a priori maximum channel length is determined or retrieved. In some approaches, the maximum channel length is a predetermined design parameter. At step 604, one or more channel taps may be detected during a period of time equal to or less than the maximum channel length. A channel tap may be detected whenever energy is present at a channel tap position, or a channel tap may be detected only when the power (or energy) at that location exceeds a threshold value. In some approaches, the threshold value is based on the channel's noise variance, e.g., a constant multiplied by the noise variance. At step 606, the last detected channel tap is identified and the delay of that channel tap is taken as the actual channel length. A set of candidate taps having a delay less than or equal to the actual channel length are then determined at step 608. The set of candidate taps, for instance, may be located at each channel tap position in the channel defined by the actual channel length. At step 610, each candidate tap, including each detected channel tap, within the channel is assigned a constant amplitude value.

The above-described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application-specific integrated circuit (ASIC) or on a field-programmable gate array (FPGA). The techniques of the disclosure may also be implemented in software.

What is claimed is:

1. A method for processing a signal using simplified channel statistics, the method comprising:
estimating a channel profile for a multipath channel, wherein estimating the channel profile for the multipath channel comprises
detecting, within a given range, a plurality of channel taps associated with a channel impulse response, and
assigning each of the plurality of channel taps a uniform amplitude value corresponding to a constant signal strength;
receiving the signal through the multipath channel; and
filtering the received signal based on the estimated channel profile.

2. The method of claim 1, wherein the channel profile is a power delay profile and the given range is a period of time, and wherein estimating the channel profile for the multipath channel further comprises:
determining a maximum channel delay of the multipath channel, and
wherein the period of time is equal to the maximum channel delay.

3. The method of claim 2, wherein the maximum channel delay is a predefined design parameter.

4. The method of claim 2, wherein the maximum channel delay is a variable parameter, and wherein determining the maximum channel delay comprises identifying, within a predefined time duration, a last channel tap in the plurality of channel taps.

5. The method of claim 1, wherein detecting the plurality of channel taps comprises:
   sampling a plurality of observed signals; and
   comparing each of the plurality of observed signals to a noise threshold;
   wherein the plurality of channel taps includes each of the plurality of observed signals having an amplitude greater than the noise threshold.

6. The method of claim 1 further comprising dividing the given range into a plurality of subintervals each having a set of candidate channel taps, wherein assigning each of the plurality of channel taps a uniform amplitude value corresponding to a constant signal strength comprises:
   determining, for each respective subinterval of the plurality of subintervals, whether the respective subinterval includes at least one of the plurality of channel taps; and
   assigning each of the set of candidate channel taps in the respective subinterval the uniform amplitude value when the respective subinterval is determined to include at least one of the plurality of channel taps.

7. The method of claim 1 further comprising:
   computing the given range by identifying, within a predefined time duration, at least one of a first channel tap in the plurality of channel taps and a last channel tap in the plurality of channel taps; and
   assigning each of a set of candidate channel taps within the given range the uniform amplitude value.

8. The method of claim 7, wherein each of the plurality of channel taps has an observed amplitude that exceeds a noise threshold, and wherein each of the set of candidate channel taps does not exceed the noise threshold.

9. The method of claim 1, wherein the channel profile is a Doppler profile and the given range is a frequency range.

10. The method of claim 1, wherein the channel profile is a power angular spectrum and the given range is an angular range.

11. A system for processing a signal using simplified channel statistics, the system comprising:
   a channel profile estimator configured to estimate a channel profile for a multipath channel by
      detecting, within a given range, a plurality of channel taps associated with a channel impulse response, and
      assigning each of the plurality of channel taps a uniform amplitude value corresponding to a constant signal strength;
   a receiver configured to receive the signal through the multipath channel; and
   a filter configured to filter the received signal based on the estimated channel profile.

12. The system of claim 11, wherein the channel profile is a power delay profile and the given range is a period of time, and wherein the channel profile estimator is further configured to:
   determine a maximum channel delay of the multipath channel, wherein the period of time is equal to the maximum channel delay.

13. The system of claim 12, wherein the maximum channel delay is a predefined design parameter.

14. The system of claim 12, wherein the maximum channel delay is a variable parameter, and wherein the channel profile estimator is further configured to determine the maximum channel delay by identifying, within a predefined time duration, a last channel tap in the plurality of channel taps.

15. The system of claim 11, wherein the channel profile estimator is further configured to detect the plurality of channel taps by:
   sampling a plurality of observed signals; and
   comparing each of the plurality of observed signals to a noise threshold,
   wherein the plurality of channel taps includes each of the plurality of observed signals having an amplitude greater than the noise threshold.

16. The system of claim 11, wherein the channel profile estimator is further configured to:
   divide the given range into a plurality of subintervals each having a set of candidate channel taps; and
   assign each of the plurality of channel taps the uniform amplitude value by
      determining, for each respective subinterval of the plurality of subintervals, whether the respective subinterval includes at least one of the plurality of channel taps, and
      assigning each of the set of candidate channel taps in the respective subinterval the uniform amplitude value when the respective subinterval is determined to include at least one of the plurality of channel taps.

17. The system of claim 11, wherein the channel profile estimator is further configured to:
   compute the given range by identifying, within a predefined time duration, at least one of a first channel tap in the plurality of channel taps and a last channel tap in the plurality of channel taps; and
   assign each of a set of candidate channel taps within the given range the uniform amplitude value.

18. The system of claim 17, wherein each of the plurality of channel taps has an observed amplitude that exceeds a noise threshold, and wherein each of the set of candidate channel taps does not exceed the noise threshold.

19. The system of claim 11, wherein the channel profile is a Doppler profile and the given range is a frequency range.

20. The system of claim 11, wherein the channel profile is a power angular spectrum and the given range is an angular range.

* * * * *